United States Patent [19]

Conseil

[11] Patent Number: 5,964,887
[45] Date of Patent: Oct. 12, 1999

[54] METHOD OF ELECTING AN ACTIVE STATION IN A DATA-PROCESSING SYSTEM MADE RELIABLE BY REPLICATION

[75] Inventor: Florence Conseil, Chatenay Malabry, France

[73] Assignee: Alcatel, Paris, France

[21] Appl. No.: 08/808,912

[22] Filed: Mar. 3, 1997

[30] Foreign Application Priority Data

Feb. 27, 1997 [FR] France .................................. 97 02350

[51] Int. Cl.⁶ .................................................. G06F 11/16
[52] U.S. Cl. .............................................. 714/11; 714/13
[58] Field of Search ........................ 395/182.09, 182.08, 395/182.1, 182.11, 200.38, 200.39

[56] References Cited

U.S. PATENT DOCUMENTS

| | | |
|---|---|---|
| 4,596,012 | 6/1986 | Reed . |
| 4,710,926 | 12/1987 | Brown et al. ...................... 395/182.08 |
| 4,912,707 | 3/1990 | Kogge et al. ...................... 395/182.15 |
| 4,939,752 | 7/1990 | Literati et al. ........................... 375/107 |
| 5,251,299 | 10/1993 | Masuda et al. . |
| 5,452,443 | 9/1995 | Oyamada et al. .................. 395/182.08 |
| 5,627,962 | 5/1997 | Goodrum et al. ................. 395/182.11 |
| 5,704,032 | 12/1997 | Badovinatz et al. ............... 395/182.02 |
| 5,777,874 | 7/1998 | Flood et al. ............................. 364/187 |

FOREIGN PATENT DOCUMENTS

| | | |
|---|---|---|
| 723223 A2 | 7/1996 | European Pat. Off. . |
| 2 721 465 A1 | 12/1995 | France . |

OTHER PUBLICATIONS

Microsoft Press, "Computer Dictionary 2nd Edition", p. 389, 1994.

*Primary Examiner*—Robert W. Beausoliel, Jr.
*Assistant Examiner*—Scott T. Baderman
*Attorney, Agent, or Firm*—Sughrue, Mion, Zinn, Macpeak & Seas, PLLC

[57] ABSTRACT

A method is described for electing an active station from two stations having respective mass memories. According to the method a mass memory is associated with the two stations. An identifier is provided in a respective persistent memory associated with each station having either a present state or an absent state. The identifier associated with one of the two stations is switched from the absent state to the present state when the other of the two stations becomes non-operational. The identifier associated with one of the two stations is switched from the present state to the absent state when the other of the two stations becomes operational. A station that becomes operational is elected as the active station if the identifier associated with the station that becomes operational is in the present state.

7 Claims, 1 Drawing Sheet

METHOD OF ELECTING AN ACTIVE STATION IN A DATA-PROCESSING SYSTEM MADE RELIABLE BY REPLICATION

BACKGROUND

The invention relates to a method of improving the reliability of a data-processing station by replication, and it is applicable to any data-processing system requiring a high level of operating reliability, e.g. to telecommunications networks which must be operational permanently.

In known manner, improving the reliability of such a system involves, in particular, duplicating the dataprocessing station. In this way, the system has an "active" station, in which the various pieces of software of the system are executed, and a "back-up" station. The system must be capable of switching over to the back-up station when the active station fails, the back-up station then becoming the active station.

Most replicated systems of this type share a common mass memory. However, such a configuration can be impossible, e.g. when the two stations are mutually remote, and cannot physically share the same peripherals. In which case, it is necessary to duplicate the station entirely including the mass memory, so that each of the two stations has its own mass memory.

In such a case, to enable the active station to be switched over to the back-up station in a manner transparent to the software applications, it is essential to have a mechanism for synchronizing the data contained in each of the two mass memories.

Unfortunately, when one of the two stations fails, the synchronization mechanism becomes impossible to implement. When the second station also fails, it is necessary, on re-starting, to elect as the active station that station which has the more recent data in its mass memory, i.e. the station that failed last, so as not to lose any information.

SUMMARY

An object of the present invention is to provide a method of electing the active station, which method solves that problem.

A second object is to accelerate re-starting of the station under degraded operating conditions under which the second station has undergone serious failure and is incapable of re-starting.

For this purpose, the method of the invention consists in using an identifier (or token) under a well-defined protocol, which identifier is contained in a persistent memory and can take up either the "absent" state or the "present" state;

For this purpose, the method of the invention is characterized in that:

each station includes, in a respective persistent memory associated with it, an identifier or token that can take up either the "present" state when said station has more recent data in its mass memory than the other station, or the "absent" state when said station does not have more recent data than said other station;

said token goes from the "absent" state to the "present" state whenever the other station becomes non-operational;

conversely, said token goes from the "present" state to the "absent" state whenever the other station becomes operational; and a station becoming operational is elected as the active station if the token is in the "present" state in the persistent memory associated with said station.

In a particular implementation, a third object of the invention consists in managing installation and removal of mass memory partitions while the system is operating, while guaranteeing that the station that has the more recent data is elected when one of the two stations fails.

For this purpose, this implementation of the method is characterized in that the token goes from the "absent" state to the "present" state whenever a replicated partition of the other station is removed, and in that said token goes from the "present" state to the "absent" state once said replicated partition is re-installed and synchronized.

BRIEF DESCRIPTION OF THE DRAWINGS

The various characteristics and advantages of the invention appear more clearly in the following description given with reference to the accompanying drawing, in which.

DETAILED DESCRIPTION

Figure 1:
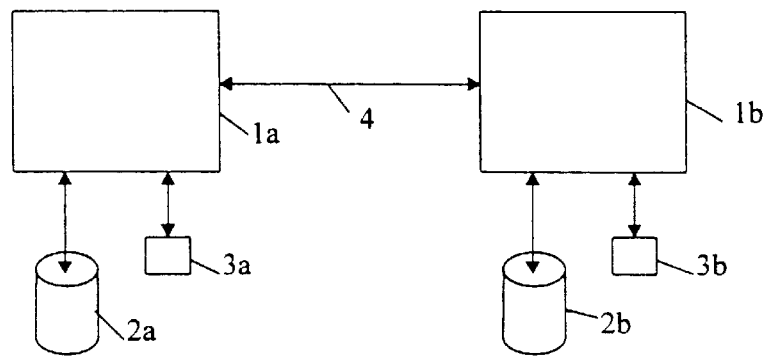
FIG. 1 is an overall block diagram of the system.

In FIG. 1, the two stations are referenced 1a and 1b. They are connected together via a conventional link 4, e.g. of the Ethernet type, which makes it possible to synchronize the data contained in each of the mass memories 2a and 2b. The mass memories are connected to the stations via means known per se, e.g. small computer standard interfaces (SCSIs) or personal computer memory card international association (PCMCIA) interfaces.

The stations 1a and 1b are further connected to respective persistent memories 3a and 3b. The memories may be implemented in various manners. Each memory may be installed directly in the mass memory of the station, or else it may installed independently in a memory of the non-volatile random access memory (NVRAM) type.

Each of the two memories 3a and 3b contains an identifier identifying the station that has the most recent data. The identifier (or token) is suitable for taking up one of two states that are referred to below as "present" and "absent". The token is present in the persistent memory (3a or 3b) only if the station (1a or 1b respectively) has more recent data in its mass memory (2a or 2b respectively) than the other station.

Two immediate consequences can be drawn from this rule:

it is impossible for the token to be present in both stations at the same time; and during normal (or nominal) operation, since neither of the stations has more recent data than the other station in its mass memory, the token is present in neither of the two stations.

In order to satisfy these general principles and to solve the problems posed, the acquisition condition consists in causing the token to go from the "absent" state to the "present" state in a station only if the other station becomes non-operational.

Conversely, the token goes from the "present" state to the "absent" state in a given station when the other station becomes operational again.

"Becoming operational again" is to be understood implicitly to mean not only that the station itself becomes operational again but also that its mass memory becomes synchronized again relative to the other mass memory, so that the data is the same for both stations. "Failed" refers to the state of a station which is not in working order, either as a result of hardware failure, or as a result of software failure.

Figure 2:
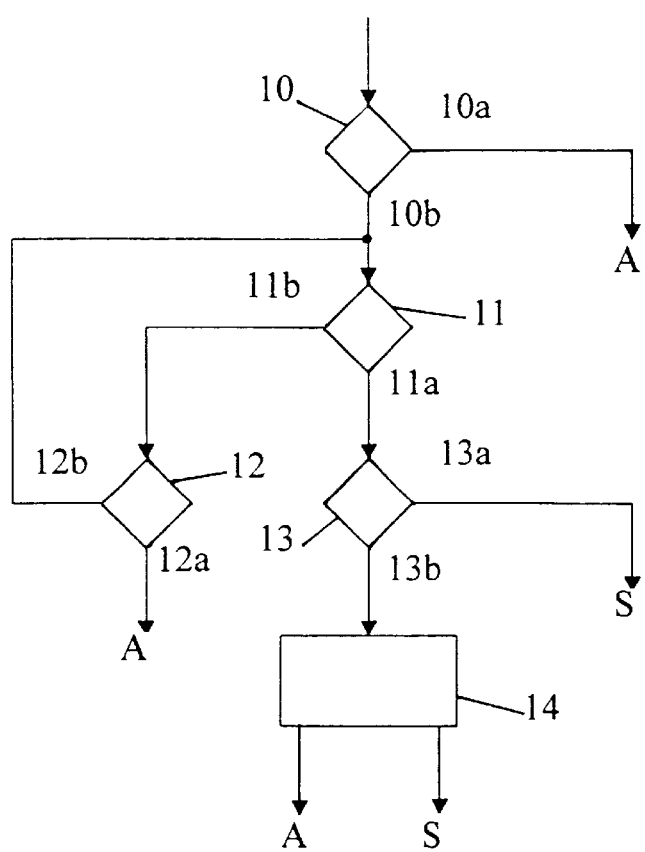
FIG. 2 is a flow chart showing the algorithm for electing the active station.

FIG. 2 is a flow chart showing the election algorithm that takes place each time a station is started up.

Firstly, the station performs a first test 10 on the presence of the token. If the token is present (10a), then said station can start up immediately as the active station (A). It should be noted that since the station has the token in the "present" state, the other station is not operational.

If the token is absent (10b), a second test 11 is then performed on the state of the second station. If the second station has not failed (11a), then another test 13 is performed to determine whether or not the second station has started up as the active station. If the second station is the active station (13a), the first station starts up as the back-up station (S). If the second station is not the active station (13b), an arbitration procedure 14 must be set up to determine which of the two stations should be activated. This occurs in particular, for example, after a general malfunction of the system. In such a case, since both systems become non-operational at the same time, and then start up again almost simultaneously, neither of them has the token, and additional arbitration means must be used to elect the active station.

Various arbitration procedures may be implemented and the invention is not to be considered as being limited to one particular procedure. Reference may be made, however, by way of example, to arbitration using the "backplane" addresses, i.e. the addresses of the respective cards of the stations in the connection cabinets.

When the response to the test 11 concerning start-up of the second station is negative (11b), a time-delay test 12 is set up. So long as a certain time has not elapsed (12b), the test 11 concerning re-starting of the second station is performed periodically. If, at some instant, the second station re-starts (11a), the algorithm continues as indicated above. If, however, the second station has not started up by the end the allotted time (12a), then the first station starts up as the active station (A).

The time delay must be longer than the station start-up time. To play safe, it is possible to increase the delay, e.g. by choosing a time delay of about twice the mean start-up time of a station.

The above-described method solves the technical problem posed, namely the problem of electing the station that has the more recent data in its mass memory.

In addition, the method makes it possible to accelerate re-starting of the station that has the more recent data. In this case, which corresponds to the reference 10a in FIG. 2, the station that as the token re-starts immediately without waiting for the other station to re-start.

The start-up time of a station depends on the hardware configuration and on the software configuration of the station, but said start-up time can be estimated approximately to be a few minutes. It is easy to understand the advantage offered to sensitive applications by such a method which makes it possible to save these minutes during which the system does not operate.

In a particular implementation of the invention, it is possible to take into account maintenance operations that are liable to be performed on the system.

In particular, the mass memory 2a or 2b of each of the stations 1b or 1b is generally constituted by a hard disk subdivided into a certain number of partitions. Typically, the partitions are of two types: replicated partitions and non-replicated partitions.

The replicated partitions are duplicated in each of the two stations, and are preferably reserved for data.

The non-replicated partitions are not duplicated and are preferably reserved for object codes which do not need to be replicated because they are not modified over time.

A maintenance operation performed on a station can consist in removing a partition from one of the two mass memories, in particular a replicated partition, e.g. so as to back data up. During the total time for which the partition is removed, it is impossible to implement the synchronization mechanism.

In an implementation of the method of the invention, the token goes from the "absent" state to the "present" state, in one station, when a replicated partition of the other station is removed and, conversely, the token goes from the "present" state to the "absent" state once the replicated partition is re-installed and re-synchronized.

I claim:

1. A method of electing an active station from two stations having respective mass memories comprising the steps of:

providing a mass memory associated with said two stations;

providing, in a respective persistent memory associated with each station, an identifier, said identifier having either a present state or an absent state;

switching said identifier associated with one of the two stations from the absent state to the present state when the other of the two stations becomes non-operational;

switching said identifier associated with one of the two stations from the present state to the absent state when the other of the two stations becomes operational; and electing a station that becomes operational as the active station if said identifier associated with said station becoming operational is in the present state.

2. A method according to claim 1, wherein said persistent memory is a memory of the NVRAM type.

3. A method of electing an active station from two stations according to claim 1 wherein said identifier switches from the absent state to the present state whenever a replicated partition of the other of said two stations is removed, and said identifier switches from the present state to the absent state once said replicated partition is re-installed and synchronized.

4. A method of electing an active station from two stations according to claim 1, wherein, even if said identifier associated with one of said two stations is in the absent state, electing one of said two stations becoming operational to be the active station if, by the end of a predetermined delay, the other of said two stations remains non-operational.

5. A method of electing an active station from two stations according to claim 4, wherein said delay is equal to twice the mean start-up time of a station.

6. A method of electing an active station from two stations according to claim 1, wherein, if neither of the two stations has a identifier in the present state on re-starting, an unambiguous arbitration is used to elect one of the two stations.

7. A method of electing an active station from two stations according to claim 6, wherein the arbitration uses a backplane address of said two stations to elect an active station.

* * * * *